(12) United States Patent
Suzuki et al.

(10) Patent No.: US 7,646,158 B2
(45) Date of Patent: Jan. 12, 2010

(54) DEVICE FOR CONTROLLING OPENING/CLOSING BODY FOR VEHICLE

(75) Inventors: Shintaro Suzuki, Kasugai (JP); Eiji Itami, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 173 days.

(21) Appl. No.: 11/922,417

(22) PCT Filed: Jun. 27, 2005

(86) PCT No.: PCT/JP2005/011726

§ 371 (c)(1),
(2), (4) Date: Dec. 18, 2007

(87) PCT Pub. No.: WO2007/000797

PCT Pub. Date: Jan. 4, 2007

(65) Prior Publication Data

US 2009/0237023 A1      Sep. 24, 2009

(51) Int. Cl.
*H02P 7/00* (2006.01)
(52) U.S. Cl. .................. 318/280; 318/264; 318/268; 318/282; 318/466
(58) Field of Classification Search .............. 318/264, 318/265, 266, 268, 272, 280, 282, 286, 445, 318/466, 468; 49/26, 28
See application file for complete search history.

(56) References Cited

U.S. PATENT DOCUMENTS

| | | | |
|---|---|---|---|
| 5,350,986 A * | 9/1994 | Long et al. .................. 318/432 |
| 6,178,699 B1 * | 1/2001 | Kawanobe et al. ............ 49/360 |
| 6,580,242 B2 * | 6/2003 | Hirose et al. ................ 318/445 |
| 6,825,623 B2 * | 11/2004 | Onozawa et al. ............ 318/257 |

(Continued)

FOREIGN PATENT DOCUMENTS

JP       10-169313 A       6/1998

(Continued)

OTHER PUBLICATIONS

English language translation of International Preliminary Report on Patentability.

(Continued)

*Primary Examiner*—Bentsu Ro
*Assistant Examiner*—Thai Dinh
(74) *Attorney, Agent, or Firm*—Buchanan Ingersoll & Rooney PC (57) ABSTRACT

The rotating speed of an output shaft of a door opening and closing motor actuating a sliding door is monitored, and whether a fluctuation value of the rotating speed is equal to or more than a first determination threshold value is determined (step S310). A second determination threshold value having a pinching detecting sensitivity that is higher than the first determination threshold value is set. When it is determined that the shift lever of the transmission is in a P position, or a foot brake is operating, or a parking brake is operating, whether the fluctuation value of the rotating speed is equal to or more than the second determination threshold value is determined (step S360). If the fluctuation value of the rotating speed is equal to or more than each of the determination threshold values, the sliding door is actuated in an opening direction (step S320).

5 Claims, 5 Drawing Sheets

U.S. PATENT DOCUMENTS

| | | | |
|---|---|---|---|
| 7,170,244 B2 * | 1/2007 | Choby | 318/280 |
| 7,212,897 B2 * | 5/2007 | Suzuki et | 701/49 |
| 2004/0212338 A1 | 10/2004 | Shimizu et al. | |
| 2004/0267425 A1 | 12/2004 | Suzuki et al. | |

FOREIGN PATENT DOCUMENTS

| | | |
|---|---|---|
| JP | 2003-252078 A | 9/2003 |
| JP | 3511347 B2 | 1/2004 |
| JP | 2004-169276 A | 6/2004 |
| JP | 2004-324052 A | 11/2004 |
| JP | 2004-324105 A | 11/2004 |

OTHER PUBLICATIONS

International Search Report.

* cited by examiner

DEVICE FOR CONTROLLING OPENING/CLOSING BODY FOR VEHICLE

FIELD OF THE INVENTION

The present invention relates to a control device for an opening/closing body of a vehicle, which device opens and closes the opening/closing body of the vehicle by a drive source.

BACKGROUND OF THE INVENTION

Conventionally, there has been widely known a sliding door opening and closing device that operates to open or close a passenger sliding door provided in a side portion of a vehicle using a drive source such as a motor. The sliding door opening and closing device mentioned above allows a sliding door to start an opening and closing operation by detecting a stopped state of the vehicle on the basis of information such as the speed of a vehicle, or the shift lever position of the transmission for a safety reason. When pinching of an obstacle is detected during a movement of the sliding door, control for stopping the sliding door or actuating the sliding door in a reverse direction is executed.

When the vehicle is changed to a moving state from a stopped state during the opening and closing operation of the sliding door, the acceleration generated at the start of the movement is applied to the sliding door, and an inertia force applied to the sliding door is erroneously detected as pinching of an obstacle so that the sliding door is stopped or actuated in the reverse direction. Accordingly, there has been proposed a sliding door opening and closing device which suppresses such erroneous detections of pinching as mentioned above by increasing a determination threshold value serving as a determination reference for detecting pinching when the vehicle stopped state is cancelled during the opening and closing operation of the sliding door (refer to Patent Document 1). In the sliding door opening and closing device in accordance with this proposal, it is determined that the vehicle stopped state is cancelled when the shift lever of the transmission is shifted to a position other than a parking position, or when the speed of the vehicle becomes higher than a certain value.

In the meantime, even if the shift lever of the transmission is shifted to a position other than the parking position, there could be a case where the vehicle stopped state carries over if the foot brake is stepped on. If the determination threshold value for detecting pinching is increased in the vehicle stopped state, there may be a case where the pinching detection is not executed even if an obstacle is pinched.

Further, when the vehicle starts, the acceleration at the starting could be applied to the sliding door before the speed of the vehicle is detected, depending on the detecting method of the vehicle speed. In such a case, inertia force is applied to the sliding door before the determination threshold value is increased, and the pinching may be erroneously detected.

Patent Document 1: Japanese Patent No. 3511347

SUMMARY OF THE INVENTION

An objective of the present invention is to provide a control device for an opening/closing body of a vehicle, which device reliably detects cancellation of a vehicle stopped state and suppresses erroneous detections of pinching.

In order to achieve the objective mentioned above, in accordance with the present invention, a control device for an opening/closing body of a vehicle, which device opens and closes the opening/closing body of the vehicle using a drive source, is provided. The control device includes vehicle speed detecting means detecting a speed of the vehicle, pinching detecting means detecting pinching of an obstacle during an opening and closing operation of the opening/closing body, and control means controlling a driving force transmitted to the opening/closing body from the drive source. When the vehicle is in a vehicle braking state, in which a shift lever of a transmission of the vehicle is in a parking position or a brake device of the vehicle is operating, and the vehicle speed detected by the vehicle speed detecting means is equal to or less than a predetermined value, the control means allows the opening and closing operation of the opening/closing body to be started. When pinching of an obstacle is detected by the pinching detecting means, the control means stops the operation of the opening/closing body or actuates the opening/closing body in a reverse direction. The control means decreases the pinching detecting sensitivity of the pinching detecting means when the vehicle braking state is cancelled during the operation of the opening/closing body.

A case where the vehicle braking state is cancelled refers to a case where the state in which the shift lever of the transmission of the vehicle is at the parking position or the brake device of the vehicle is operating is cancelled, that is, a case where the shift lever of the transmission of the vehicle is at a position other than the parking position and the brake device of the vehicle is not operating.

In accordance with one embodiment, the control means executes control for decreasing the pinching detecting sensitivity only during an operation in a closing direction of the opening/closing body.

In accordance with one embodiment, the control means is structured so as to detect pinching of an obstacle by comparing the detected value by the pinching detecting means with a first determination threshold value. In the vehicle braking state, the control means detects pinching of an obstacle by further comparing a second determination threshold value having a higher pinching detecting sensitivity than the first determination threshold value with the detected value, thereby decreasing the pinching detecting sensitivity at a time when the vehicle braking state is cancelled.

In accordance with one embodiment, the control means detects pinching of an obstacle by comparing the detected value by the pinching detecting means with a third determination threshold value in the vehicle braking state. When the vehicle braking state is cancelled, the control means decreases the pinching detecting sensitivity by comparing a value obtained by multiplying the detected value by a predetermined coefficient or a value obtained by subtracting a predetermined amount from the detected value with the third determination threshold value.

In accordance with one embodiment, the opening/closing body is a sliding door provided in a side portion of the vehicle or a back door provided in a back portion of the vehicle.

In accordance with the present invention, when the state in which the vehicle braking state is cancelled during the operation of the opening/closing body is detected, the pinching detecting sensitivity of the pinching detecting means is decreased. Accordingly, it is possible to reliably detect the cancellation of the vehicle stopped state, and it is possible to prevent the pinching detecting sensitivity from being decreased before the start of the vehicle. Accordingly, it is possible to execute an original pinching detection in the vehicle stopped state. Also, by decreasing the pinching detecting sensitivity in the vehicle traveling state, it is possible to prevent erroneous detection of pinching due to an inertia force of the opening/closing body. Further, since the cancellation of the vehicle stopped state is detected without using speed information of the vehicle, it is possible to avoid a situation in which the inertial force of the opening/closing body is applied before the vehicle speed is detected, and the pinching is erroneously detected.

DETAILED DESCRIPTION OF THE PREFERRED EMBODIMENTS

First Embodiment

With reference to FIGS. 1 to 4, a description will be given of a first embodiment, in which a control device for an opening/closing body of a vehicle in accordance with the present invention is applied to an opening and closing control of a sliding door provided in a side portion of a vehicle.

Figure 1:
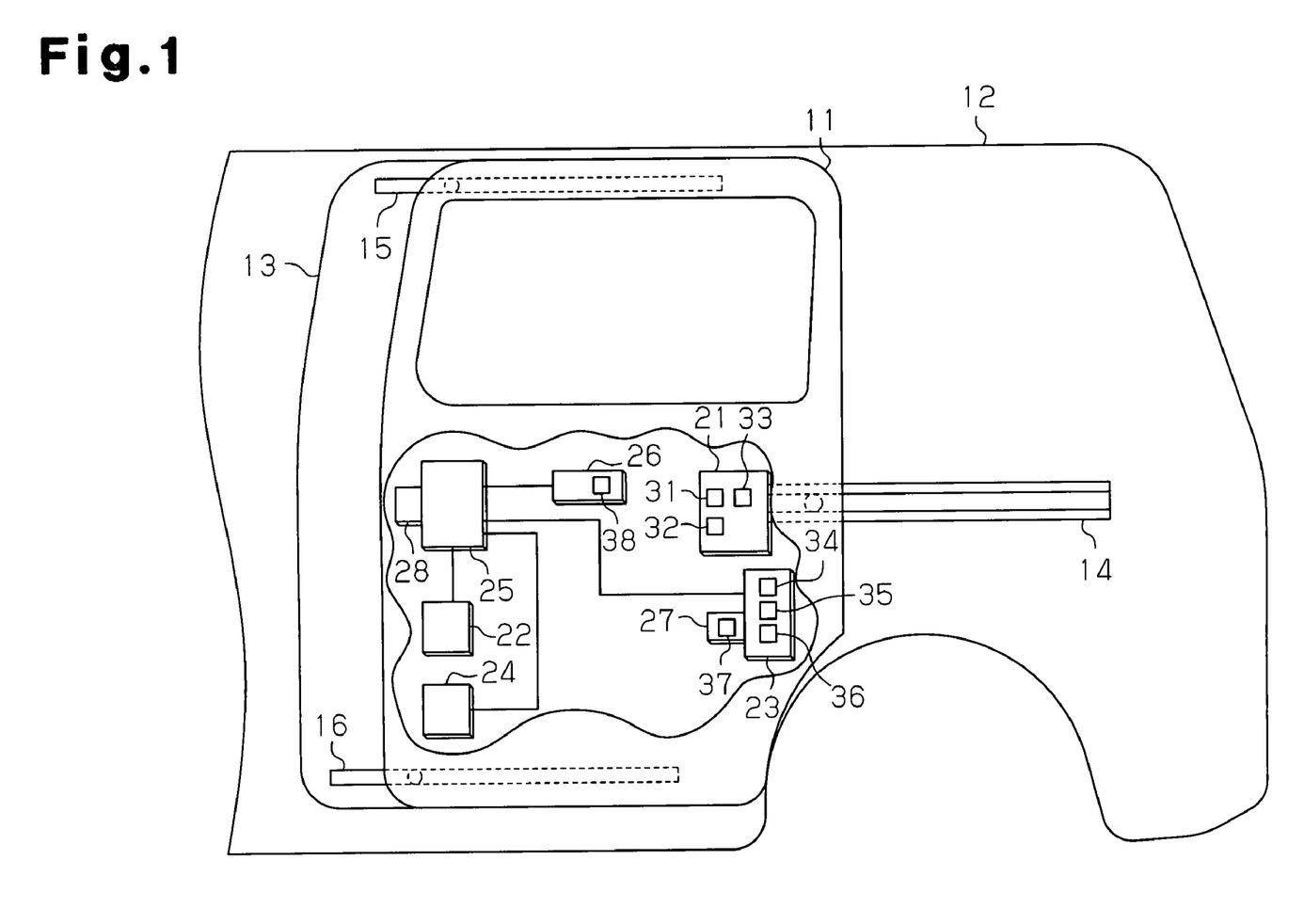
FIG. 1 is a block diagram of a layout of a sliding door control device in accordance with a first embodiment of the present invention.

FIG. 1 shows a schematic structure of a sliding door 11. The sliding door 11 serving as the opening/closing body is actuated in such a manner as to open and close a door opening 13 formed in a body side portion 12 of the vehicle. The body side portion 12 is provided with a center guide rail 14 and a pair of upper and lower guide rails 15 and 16 in such a manner as to extend in a longitudinal direction of the body side portion 12. The sliding door 11 is supported by the guide rails 14 to 16 so as to be slidable with respect to the body side portion 12. The sliding door 11 is provided with a sliding door actuating mechanism 21 actuating the sliding door 11.

The sliding door actuating mechanism 21 actuates the sliding door 11 to open and close on the basis of a driving force of a door opening and closing motor 31 serving as the drive source. The sliding door actuating mechanism 21 has a known structure provided with a cable coupled to the body side portion 12 and a drum around which the cable is wound. The sliding door 11 is slid with respect to the body side portion 12 by rotating the drum by the door opening and closing motor 31 so as to wind up or feed out the cable with respect to the drum. Further, the sliding door actuating mechanism 21 is provided with a clutch 32 switching a driving force transmission between the door opening and closing motor 31 and the drum to a connection state or a disconnection state, and a rotation sensor 33 constructed by a Hall element and detecting the rotation of the drum. Since the sliding door 11 is moved in accordance with the rotation of the drum, it is possible to detect an operating state of the sliding door 11 by the rotation sensor 33.

The sliding door 11 is provided with a pair of front and rear latch mechanisms 22 and 23 holding the sliding door 11 in a closed state with respect to the body side portion 12, and a hook mechanism 24 holding the sliding door 11 in an open state with respect to the body side portion 12. Further, the sliding door 11 is provided with a remote control mechanism 25 actuating the latch mechanisms 22 and 23 and the hook mechanism 24, and a release actuator 26 actuating the latch mechanisms 22 and 23 and the hook mechanism 24 with the remote control mechanism 25.

Each of the latch mechanisms 22 and 23 is structured so as to be provided with a rotatable latch engaging with and disengaging from a striker fixed to the body side portion 12, and a pole engaging with and disengaging from the latch. The latch mechanism 22 takes a fully latched state of holding the sliding door 11 in a complete closed state or an unlatched state capable of opening the sliding door 11. Further, the latch mechanism 23 takes a fully latched state of holding the sliding door 11 in a complete closed state, a half latched state of holding the sliding door 11 in a half closed state, or an unlatched state capable of opening the sliding door 11. The latch mechanism 23 is provided with a full latch switch 34 detecting the fully latched state of the latch mechanism 23, a half latch switch 35 detecting the half latched state, and a pole switch 36 detecting a motion of the pole at a time when the latch mechanism 23 comes to each of the states. The latch mechanism 23 is provided with a closure mechanism 27 changing the latch mechanism 23 from the half latched state to the fully latched state. The closure mechanism 27 is a known structure having a closing motor 37, and rotating the latch of the latch mechanism 23 by a lever.

The hook mechanism 24 is a structure provided with a rotatable hook engaging with and disengaging from an engagement pin provided in the body side portion 12, and takes a hooked state holding the sliding door 11 in an open state or an unhooked state allowing the sliding door 11 to be slid to close.

The remote control mechanism 25 mechanically couples a handle 28 provided in each of inner and outer sides of a passenger compartment to the latch mechanisms 22 and 23 and the hook mechanism 24 with a rod, a cable or the like. Further, a passenger operates the handle 28, thereby actuating the latch mechanisms 22 and 23 and the hook mechanism 24.

The release actuator 26 has a release motor 38, and is mechanically coupled to a pair of front and rear latch mechanisms 22 and 23 and the hook mechanism 24 with the remote control mechanism 25 by a rod, a cable or the like. Further, the latch mechanisms 22 and 23 and the hook mechanism 24 are actuated by driving the release motor 38.

Figure 2:
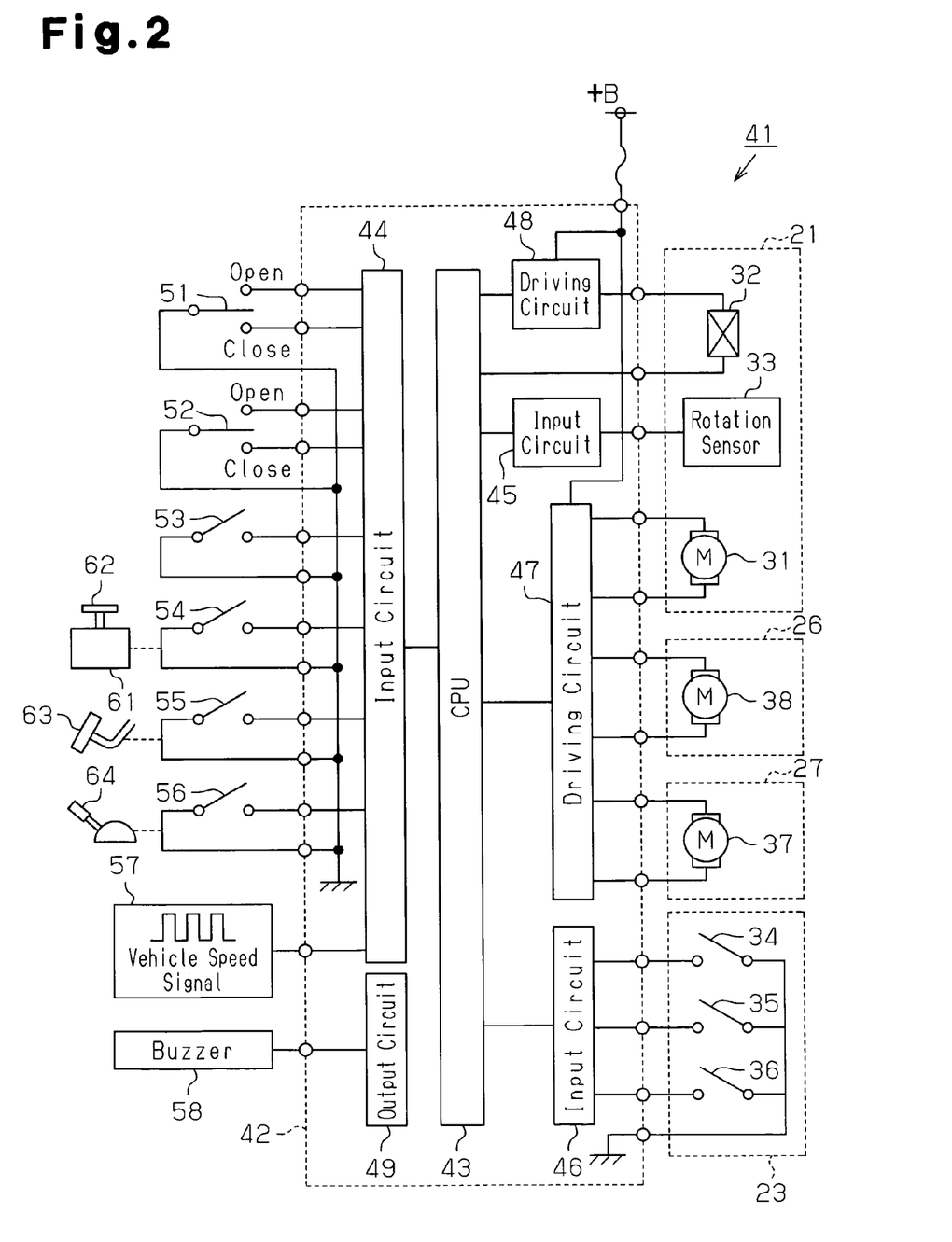
FIG. 2 is a diagram showing the system of the sliding door control device in FIG. 1.

FIG. 2 shows a system structure of a control device 41 controlling an opening and closing operation of the sliding door 11. The control device 41 is structured so as to control the opening and closing operation of the sliding door 11 by a controller 42. The controller 42 serving as the control means is provided with a CPU 43 controlling the opening and closing control of the sliding door 11, input circuits 44 to 46 inputting signals from sensors and switches, driving circuits 47 and 48 driving an external device, and an output circuit 49. Further, a predetermined power source (+B) is supplied to the controller 42 from a battery of the vehicle.

The input circuit 44 receives signals from an outdoor operation switch 51, an indoor operation switch 52, a main switch 53, a P position switch 54, a foot brake switch 55, a parking brake switch 56, and a vehicle speed sensor 57. The outdoor operation switch 51 and the indoor operation switch 52 each output an opening operation signal and a closing operation signal of the sliding door 11. The main switch 53 outputs a signal allowing an opening and closing actuation of the sliding door 11. In addition, when the main switch 53 is set so as not to allow the opening and closing actuation of the sliding door 11, the clutch 32 comes to a disconnected state, whereby it is possible to manually open and close the sliding door 11. The P position switch 54 outputs a signal indicating that a shift lever 62 of a transmission 61 is at a parking (P) position. The foot brake switch 55 outputs a signal indicating that a foot brake 63 serving as the brake device is in an operated state. The parking brake switch 56 outputs a signal indicating that the parking brake 64 serving as the brake device is in an operated state. The vehicle speed sensor 57 serving as the vehicle speed detecting means outputs a vehicle speed signal generating in correspondence to rotation of a wheel. Further, the signal from the rotation sensor 33 is input to the input circuit 45. The input circuit 46 receives state signals respectively from the full latch switch 34, the half latch switch 35, and the pole switch 36. The CPU 43 receives the various signals mentioned above through the input circuits 44 to 46.

The door opening and closing motor 31, the release motor 38 and the closing motor 37 are connected to the driving circuit 47, and the clutch 32 is connected to the driving circuit 48. The motors 31, 37 and 38 and the clutch 32 are controlled on the basis of a driving signal output from the CPU 43. Further, a buzzer 58 generating an alarm for passengers is connected to the output circuit 49.

Next, a description will be given of a pinching dealing control. The controller 42 serving as the pinching detecting means executes a pinching dealing control to actuate the sliding door 11 in a reverse direction in the case of detecting pinching of an obstacle during the opening and closing operation of the sliding door 11. The pinching dealing control is executed by monitoring the signal of the rotation sensor 33 at a time when the sliding door 11 is operated on the basis of the actuation of the door opening and closing motor 31. In other words, the controller 42 monitors a rotating speed of the drum detected by the rotation sensor 33, and determines that the obstacle is pinched in the sliding door 11 when a fluctuation value of the rotating speed is equal to or more than a predetermined value, thereby actuating the sliding door 11 in the reverse direction. In this pinching dealing control, the structure may be made so as to stop the operation of the sliding door 11 at a time when an obstacle is determined to be pinched.

Figure 3:
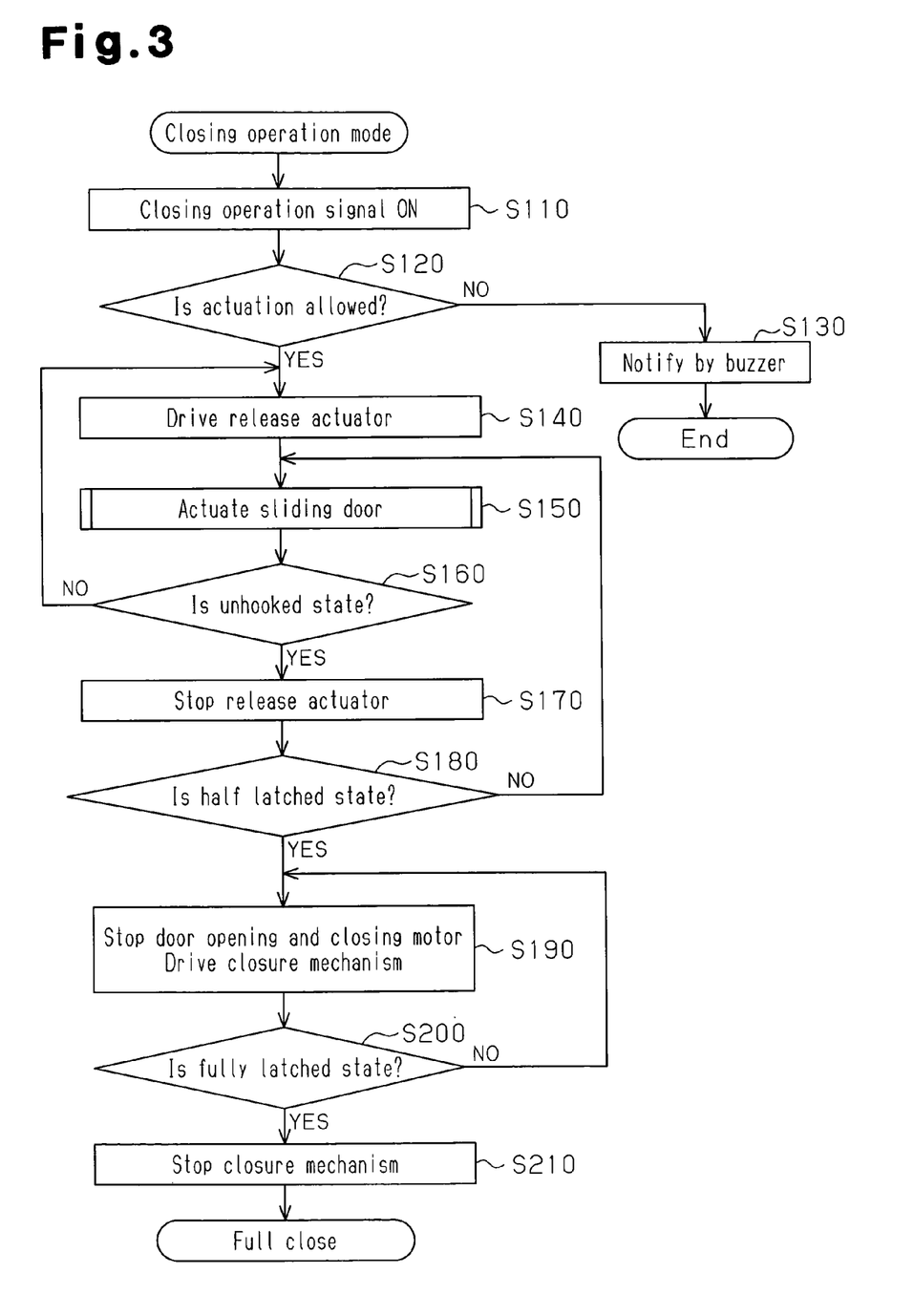
FIG. 3 is a flowchart of the first embodiment showing a procedure for closing the sliding door.

Next, a description will be given of a closing operation control of the sliding door 11. FIG. 3 shows a flowchart of a closing operation mode in which the sliding door 11 is changed from the full open state to the full close state. The closing operation mode is set such that the main switch 53 allows the opening and closing actuation of the sliding door 11, and is started when a closing operation signal of the sliding door 11 is input to the controller 42 from the outdoor operation switch 51 or the indoor operation switch 52 (step S110). When the closing operation signal is input, the controller 42 determines whether the vehicle is in a state allowing the actuation of the sliding door 11 to be started (step S120). Specifically, the controller 42 determines whether the vehicle is in the vehicle braking state, in which the shift lever 62 of the transmission 61 is at the parking position, the foot brake 63 or the parking brake 64 is operating, and the vehicle speed detected by the vehicle speed detected by the vehicle speed sensor 57 is equal to or less than a predetermined value. If the vehicle is not in the vehicle state allowing the actuation of the sliding door 11 to be started, the controller 42 generates alarm from the buzzer 58, and notifies the passenger that the sliding door 11 cannot be closed (step S130). Accordingly, the sliding door 11 is prevented from being actuated during a high speed traveling of the vehicle.

In the vehicle state allowing the actuation the sliding door 11 to be started, the controller 42 drives the release actuator 26 by driving the release motor 38, and actuates the hook mechanism 24 from a hooked state to an unhooked state (step S140). Next, after a predetermined time in which the hook mechanism 24 is assumed to have been changed to the unhooked state, the controller 42 actuates the sliding door 11 in a closing direction by driving the door opening and closing motor 31 (step S150). Further, the controller 42 determines whether the hook mechanism 24 is changed to the unhooked state by detecting a moving amount of the sliding door 11 on the basis of the signal from the rotation sensor 33 (step S160). If the sliding door 11 is not moved by a predetermined amount or more, the controller 42 determines that the hook mechanism 24 has not been changed to the unhooked state, and repeats the processes from step S140.

Since it is possible to determine that the hook mechanism 24 is changed to the unhooked state when the sliding door 11 is moved by the predetermined amount or more, the controller 42 stops driving the release actuator 26 (step S170). Next, the controller 42 determines on the basis of the signals from the half latch switch 35 and the pole switch 36 whether the latch mechanism 23 is in the half latched state (step S180). If the latch mechanism 23 is not in the half latched state, the controller 42 is returned to step S150 so as to continue the movement of the sliding door 11. If the latch mechanism 23 is in the half latched state, the controller 42 stops driving the door opening and closing motor 31, and drives the closure mechanism 27 by actuating the closing motor 37 (step S190). Further, the controller 42 determines on the basis of the signals from the full latch switch 34 and the pole switch 36 whether the latch mechanism 23 is in the fully latched state (step S200). If the latch mechanism 23 is not in the fully latched state, the controller 42 is returned to step S190 so as to continue the operation of the closure mechanism 27. If the latch mechanism 23 is in the fully latched state, the controller 42 determines that the sliding door 11 is in the full close state, and stops driving the closure mechanism 27 (step S210).

Next, a description will be given of the pinching dealing control during the closing operation of the sliding door 11. The controller 42 decreases the pinching detecting sensitivity for determining the pinching at a time when the vehicle traveling is started during the closing operation of the sliding door 11, that is, at a time when the vehicle braking state is cancelled. When the traveling of the vehicle is started, the acceleration generated at the time of starting the traveling can be applied to the sliding door, so that the inertia force applied to the sliding door is erroneously detected as pinching of an obstacle. A description will be given below of a process for decreasing the pinching detecting sensitivity.

Figure 4:
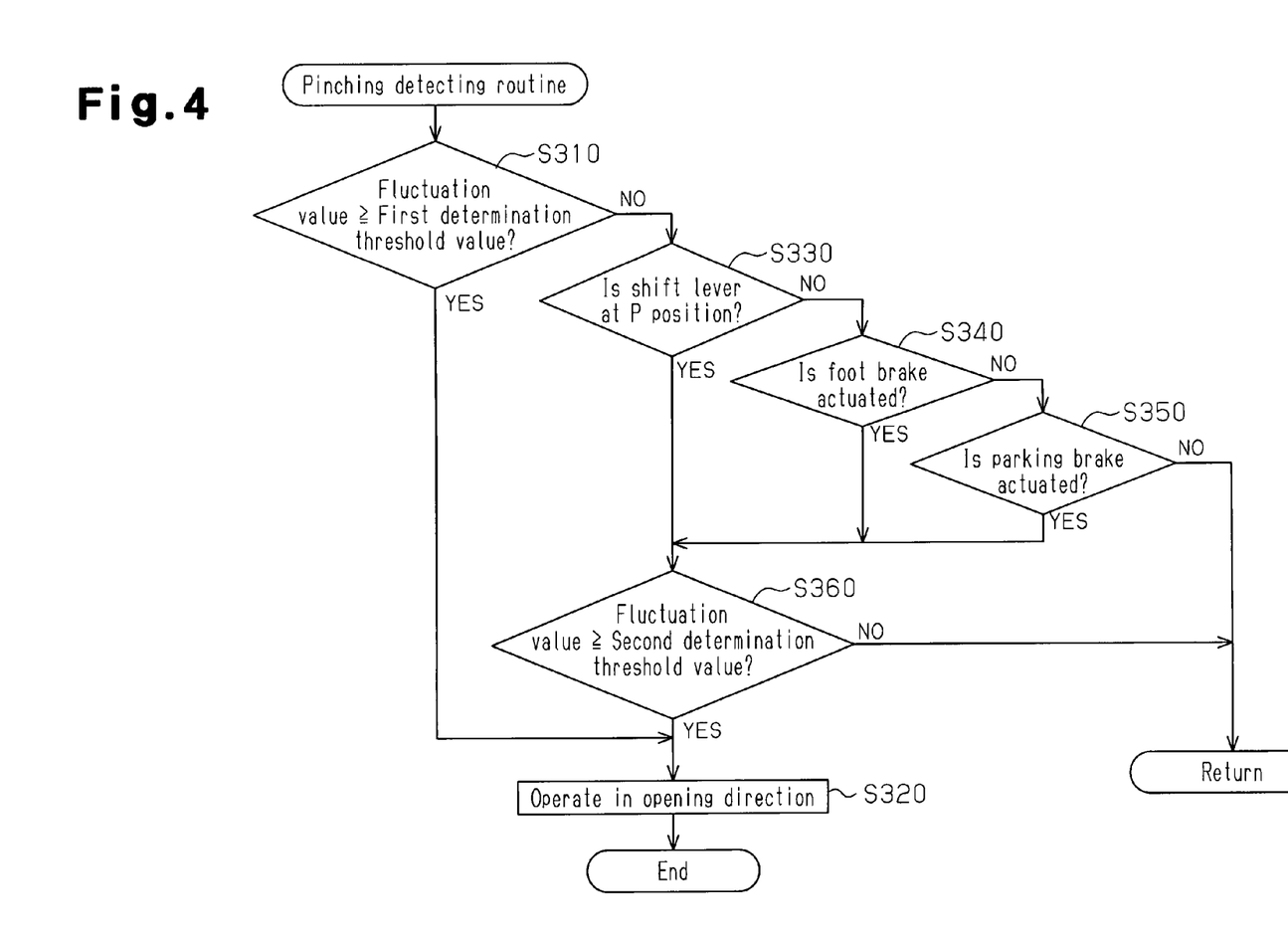
FIG. 4 is a flowchart of the first embodiment showing a procedure for detecting pinching.

FIG. 4 shows a flowchart of a pinching detecting routine at a time of the closing operation of the sliding door 11. This routine is started when the closing operation of the sliding door 11 is started by the operation of the door opening and closing motor 31. When the closing operation is started, the controller 42 monitors the rotating speed of the drum detected by the rotation sensor 33, and determines whether the fluctuation value of the rotating speed is equal to or more than a first determination threshold value (step S310). If the fluctuation value of the rotating speed is equal to or more than the first determination threshold value, the controller 42 determines that an obstacle is pinched, and actuates the sliding door 11 in an opening direction (step S320).

When the fluctuation value of the rotating speed is less than the first determination threshold value, the controller 42 determines on the basis of the signal from the P position switch 54 whether the shift lever 62 of the transmission 61 is at the P position (step S330). If the shift lever 62 is not at the P position, the controller 42 determines on the basis of the signal from the foot brake switch 55 whether the foot brake 63 is in the operating state (step S340). If the foot brake 63 is not in the operating state, the controller 42 determines on the basis of the signal from the parking brake switch 56 whether the parking brake 64 is in the operating state (step S350). If the parking brake 64 is not in the operating state, the controller 42 is returned to step S310.

If it is determined in step S330 that the shift lever 62 of the transmission 61 is at the P position, or if it is determined in step S340 that the foot brake 63 is in the operating state, or if it is determined in step S350 that the parking brake 64 is in the operating state, the controller 42 determines whether the fluctuation value of the rotating speed is equal to or more than a second determination threshold value (step S360). The second determination threshold value is set to a smaller value than the first determination threshold value. Accordingly, in the pinching determination in step S360, the pinching detecting sensitivity is set higher than that in the pinching determination in step S310. Further, the controller 42 determines that an obstacle is pinched so as to operate the sliding door 11 in the opening direction if the fluctuation value of the rotating speed is equal to or more than the second determination threshold value (step S320), and the process is returned to step S310 if the fluctuation value of the rotating speed is less than the second determination threshold value.

The first embodiment mentioned above has following advantages.

(1) According to the first embodiment, the pinching detecting sensitivity is decreased when the state (the vehicle braking state) in which the shift lever 62 of the transmission 61 is in the parking position or the foot brake 63 or the parking brake 64 is operating is cancelled during the operation of the sliding door 11 in the closing direction. In other words, even if the shift lever 62 of the transmission 61 is changed to a position other than the parking position during the operation of the sliding door 11 in the closing direction, the pinching detecting sensitivity is maintained at a high level when the foot brake 63 or the parking brake 64 is operating. Accordingly, it is possible to reliably detect the cancellation of the vehicle stopped state, and it is possible to prevent the pinching detecting sensitivity from being decreased before the vehicle starts traveling.

(2) According to the first embodiment, in the vehicle braking state, pinching is detected by comparing the fluctuation value of the rotating speed with the first determination threshold value and the second determination threshold value. When the vehicle braking state is cancelled, pinching is detected by comparing the fluctuation value of the rotating speed with the first determination threshold value. Accordingly, when the vehicle braking state is cancelled, it is possible to decrease the pinching detecting sensitivity in comparison with the case where the vehicle braking state is provided. Therefore, when the acceleration generated at a time of starting the traveling of the vehicle is applied to the sliding door 11, the inertia force applied to the sliding door 11 is not erroneously detected as pinching of an obstacle.

(3) According to the first embodiment, the structure is made such that the door opening 13 comes to the closed state when the sliding door 11 is in the front side of the vehicle, and the door opening 13 comes to the open state when the sliding door 11 is in the rear side of the vehicle. Since the inertia force of the sliding door 11 acts rearward (in the reverse direction relative to the forward moving direction of the vehicle) on the basis of the starting of the vehicle, it is possible to effectively suppress the erroneous detection of pinching by executing the control for decreasing the pinching detecting sensitivity during the closing operation in which the sliding door 11 is moved from the rear side to the front side.

Second Embodiment

Figure 5:
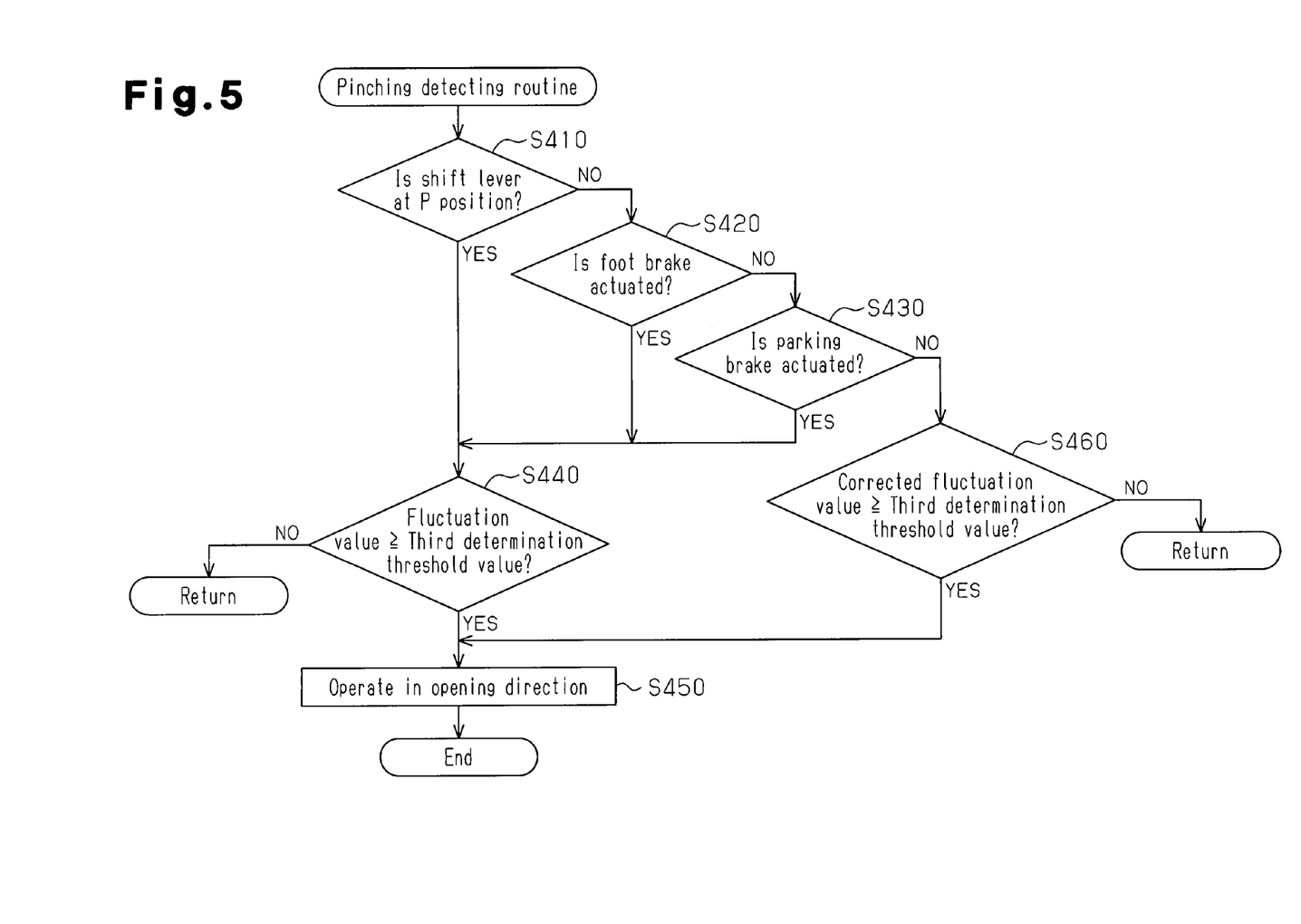
FIG. 5 is a flowchart of a second embodiment showing a procedure of detecting pinching.

With reference to FIG. 5, a description will be given of a second embodiment in which the control device for an opening/closing body of a vehicle in accordance with the present invention is applied to an opening and closing control of a sliding door provided in a side portion of a vehicle. The second embodiment is different from the first embodiment only in a process (refer to FIG. 4) for decreasing the pinching detecting sensitivity. In the embodiment described below, like or the same reference numerals are given to those components that are like or the same as the corresponding components of the first embodiment, and detailed explanations are omitted or simplified.

FIG. 5 shows a flowchart of a pinching detection routine at a time of a closing operation of the sliding door 11. This routine is started when the closing operation of the sliding door 11 is started by the operation of the door opening and closing motor 31. When the closing operation is started, the controller 42 determines on the basis of the signal from the P position switch 54 whether the shift lever 62 of the transmission 61 is at the P position (step S410). If the shift lever 62 is not at the P position, the controller 42 determines on the basis of the signal from the foot brake switch 55 whether the foot brake 63 is in the operating state (step S420). If the foot brake 63 is not in the operating state, the controller 42 determines on the basis of the signal from the parking brake switch 56 whether the parking brake 64 is in the operating state (step S430). If it is determined in step S410 that the shift lever 62 of the transmission 61 is at the P position, or if it is determined in step S420 that the foot brake 63 is in the operating state, or if it is determined in step S430 that the parking brake 64 is in the operating state, the controller 42 proceeds to step S440. Further, the controller 42 monitors the rotating speed of the drum detected by the rotation sensor 33, and determines whether the fluctuation value of the rotating speed is equal to or more than a third determination threshold value (step S440). If the fluctuation value of the rotating speed is equal to or more than the third determination threshold value, the controller 42 determines that the obstacle is pinched so as to actuate the sliding door 11 in the opening direction (step S450), and if the fluctuation value of the rotating speed is less than the third determination threshold value, the process goes back to step S410.

If it is determined in step S430 that the parking brake 64 is not in the operating state, the controller 42 determines whether a corrected fluctuation value obtained by multiplying the fluctuation value of the rotating speed by a coefficient α is equal to or more than the third determination threshold value (step S460). The coefficient α is a constant which is set within a range larger than 0 and less than 1. Accordingly, the pinching determination in step S460 is performed using a pinching detecting sensitivity that is lower than that used in the pinching determination in step S440. The corrected fluctuation value may be set to a value obtained by subtracting a predetermined amount from the fluctuation value of the rotating speed. Further, when the corrected fluctuation value is equal to or more than the third determination threshold value, the controller 42 determines that an obstacle is pinched and actuates the sliding door 11 in the opening direction (step S450). If the corrected fluctuation value is less than the third determination threshold value, the controller 42 returns to step S410.

In accordance with the second embodiment mentioned above, in addition to the advantages (1) and (3) of the first embodiment, it is possible to obtain the following advantage.

(4) According to the second embodiment, in the vehicle braking state, pinching is detected by comparing the fluctuation value of the rotating speed with the third determination threshold value. When the vehicle braking state is cancelled, pinching is detected by comparing the corrected fluctuation value obtained by multiplying the fluctuation value of the rotating speed by the coefficient α with the third determination threshold value. Accordingly, when the vehicle braking state is cancelled, it is possible to decrease the pinching detecting sensitivity in comparison with that in the vehicle braking state. Therefore, when the acceleration generated at a time of starting the traveling of the vehicle is applied to the sliding door 11, the inertia force applied to the sliding door 11 is not erroneously detected as pinching of an obstacle.

The embodiments mentioned above may be modified as follows.

In the first and second embodiments, the control device for an opening/closing body of a vehicle in accordance with the present invention is applied to the opening and closing control of the sliding door 11 provided in the side portion of the vehicle. However, the control device may be applied to a back door provided in a rear portion of the vehicle. Further, the control device may be applied to hinged vehicle doors in addition to sliding vehicle doors.

In the first and second embodiments, when the vehicle braking state is cancelled during the operation of the sliding door 11 in the closing direction, the pinching detecting sensitivity is decreased. However, the same control may be executed during the operation of the sliding door 11 in the opening direction.

What is claimed is:

1. A control device for an opening/closing body of a vehicle, the device opening and closing the opening/closing body using a drive source, the control device comprising:
   a vehicle speed detector detecting a speed of the vehicle;
   a pinching detector detecting pinching of an obstacle during an opening and closing operation of the opening/closing body; and
   a controller controlling a driving force transmitted to the opening/closing body from the drive source,
   wherein, when the vehicle is in a vehicle braking state, in which a shift lever of a transmission of the vehicle is in a parking position or a brake device of the vehicle is operating, and the vehicle speed detected by the vehicle speed detector is equal to or less than a predetermined value, the controller allows the opening and closing operation of the opening/closing body to be started, and
   wherein, when pinching of an obstacle is detected by the pinching detector, the controller stops the operation of the opening/closing body or actuates the opening/closing body in a reverse direction, and
   wherein the controller decreases a pinching detecting sensitivity of the pinching detector when the vehicle braking state is cancelled during the operation of the opening/closing body.

2. The control device according to claim 1, wherein the controller executes the control for decreasing the pinching detecting sensitivity only during an operation in a closing direction of the opening/closing body.

3. The control device according to claim 1, wherein the controller detects pinching of an obstacle by comparing the detected value by the pinching detector with a first determination threshold value, and wherein, when the vehicle is in the vehicle braking state, the controller detects pinching of an obstacle by further comparing the detected value with a second determination threshold value having a higher pinching detecting sensitivity than the first determination threshold value, thereby decreasing the pinching detecting sensitivity at a time when the vehicle braking state is cancelled.

4. The control device according to claim 1, wherein, when the vehicle is in the vehicle braking state, the controller detects pinching of an obstacle by comparing the detected value by the pinching detector with a third determination threshold value, and wherein, when the vehicle braking state is cancelled, the controller compares a value obtained by multiplying the detected value by a predetermined coefficient or a value obtained by subtracting a predetermined amount from the detected value with the third determination threshold value, thereby decreasing the pinching detecting sensitivity.

5. The control device according to claim 1, wherein the opening/closing body is a sliding door provided in a side portion of the vehicle or a back door provided in a back portion of the vehicle.

* * * * *